United States Patent [19]

Diemer et al.

[11] 4,167,854

[45] Sep. 18, 1979

[54] TORQUE CONVERTER WITH INTERNALLY REVERSIBLE TURBINE SHAFT

[75] Inventors: Donald P. Diemer, Peoria, Ill.; Martin C. Gunton, Coventry, England; Charles R. Miller, Peoria, Ill.

[73] Assignee: Caterpillar Tractor Co., Peoria, Ill.

[21] Appl. No.: 939,009

[22] Filed: Sep. 1, 1978

[51] Int. Cl.² ............................................ F16D 33/00
[52] U.S. Cl. ........................................ 60/331; 60/332; 60/352; 60/361; 415/55; 415/156
[58] Field of Search .................. 60/327, 331, 332, 334, 60/352, 354, 361, 367, 356; 415/55, 148, 151, 156; 29/156 FC

[56] References Cited
U.S. PATENT DOCUMENTS

| 2,501,771 | 3/1950 | Gray | 60/332 |
|---|---|---|---|
| 3,525,221 | 8/1970 | Maxwell et al. | 60/352 |

Primary Examiner—Edgar W. Geoghegan
Attorney, Agent, or Firm—Phillips, Moore, Weissenberger, Lempio & Majestic

[57] ABSTRACT

Gearing is normally used to obtain reverse operation from an output turbine. An improvement is provided herein in a torque converter (10) which comprises a stator (12), an impeller (14) and an output turbine (16). The improvement comprises a plurality of self-cambering blades (42) carried by the output turbine (16) with the angle at which fluid impelled by the impeller (14) attacks the self-cambering blades (42) being adjusted to select the direction of rotation of the output turbine (16). In this manner, the output shaft (36), which is driven by the output turbine (16), can be rotated in either a clockwise or a counterclockwise direction thereby driving a vehicle or other machinery in either a forward or reverse direction without the necessity for gearing.

8 Claims, 5 Drawing Figures

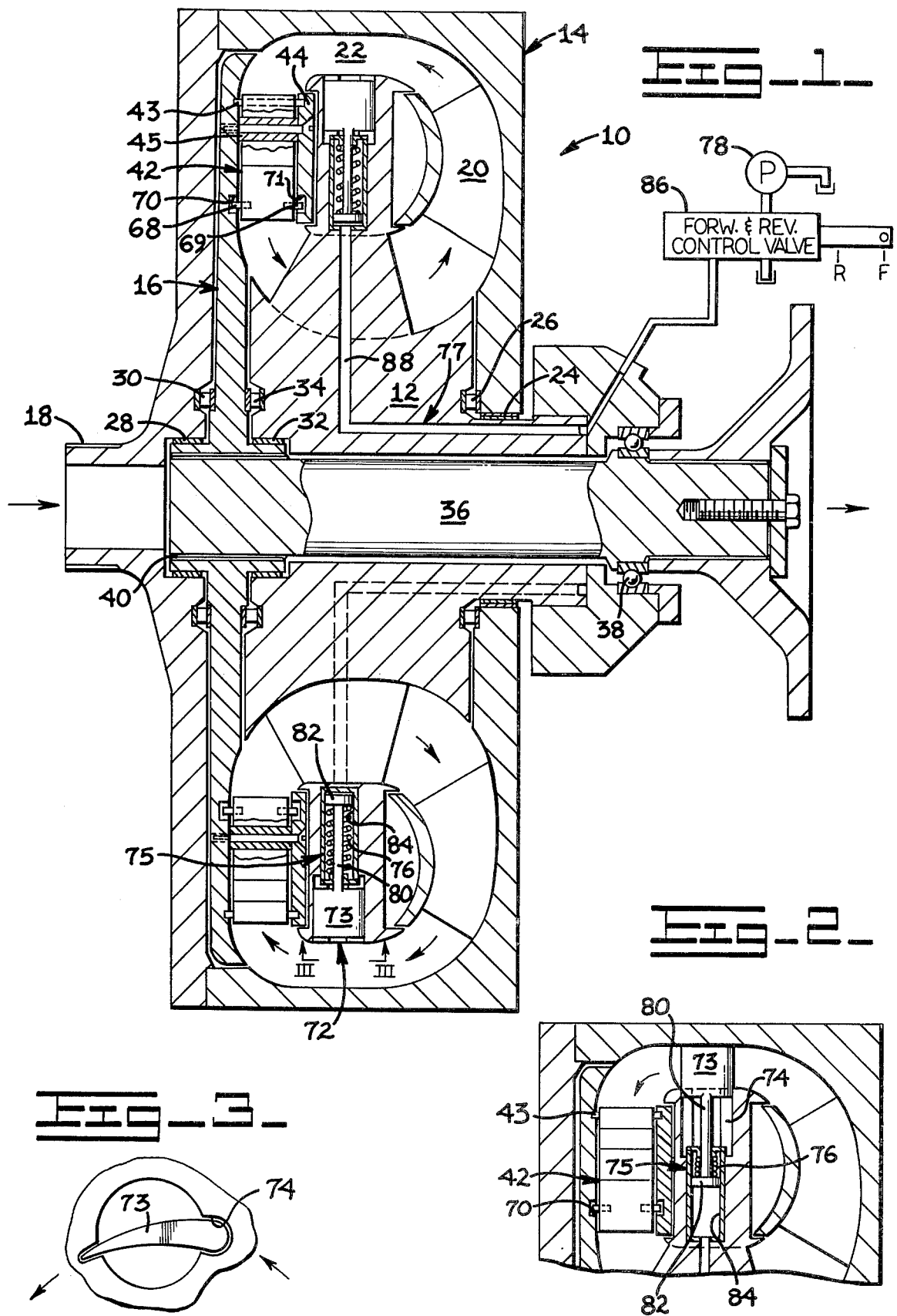

TORQUE CONVERTER WITH INTERNALLY REVERSIBLE TURBINE SHAFT

TECHNICAL FIELD

The invention relates to self-cambering blades. More particularly the invention relates to the use of said blades as the blades of an output turbine of a torque converter whereby the output shaft driven by the output turbine can be made to rotate in either a clockwise or a counterclockwise direction.

BACKGROUND ART

Prior art torque converters generally comprise a stator, an impeller and an output turbine with the impeller and the output turbine being coaxial. The impeller's blades create a fluid flow past the stator, which fluid flow has both an axial component and a tangential component. The fluid flow is then directed to blades of a fixed camber carried by the output turbine whereby the output turbine is rotated and an output shaft which is keyed thereto is rotated only in a single direction. If one wishes to obtain reverse direction rotation of parts driven by the output shaft, it is necessary to use conventional reverse gearing of one sort or another. This requires the use of gearing components which may have considerable friction losses, and, in any event, are expensive to machine and produce and add to the weight of the overall apparatus in which the torque converter is being utilized.

While the prior art shows some solid blading which can be mounted on a pin and rotated externally to effect a change in the pitch of the blade, such a technique is used to rotate vanes to control air flow through a radiator or the like or to choke the flow of a centrifugal blower. That is, even such rigid blading, which is rotatable only to effect a change in the pitch of the blade, is not used in a torque converter and is not used to control the direction of rotation of an output turbine.

DISCLOSURE OF INVENTION

In one aspect of the present invention, an improvement is provided in a torque converter which comprises a stator, an impeller and an output turbine. The torque converter has been improved by providing a plurality of self-cambering blades carried by the output turbine along with means for adjusting the angle at which fluid impelled by the impeller impinges upon the self-cambering blades and the resultant direction of rotation of the output turbine.

In another aspect of the present invention an improved self-cambering blade is provided which comprises a first linearly extending section shaped to receive fluid flow; a final linearly extending section downstream of the first section and shaped to release fluid flow; at least one intermediate linearly extending section between the first section and the final section; means for pivotally attaching each section to a next in order of the sections along pivotal axes parallel to the linear extent of the sections; and means for stopping pivoting of each of the sections relative to the next in order thereof in both a clockwise and a counterclockwise direction after a preselected amount of relative rotation.

The invention advantageously provides reversing of the direction of rotation of a torque converter by substantially reversing the tangential component of fluid impelled by the impeller of the torque converter and reversing the camber of the turbine blades. Reverse operation is thereby provided without the need for gearing.

BRIEF DESCRIPTION OF DRAWINGS

The invention will be better understood by reference to the figures of the drawings wherein like numbers denote like parts throughout and wherein:

FIG. 1 illustrates in side section, partially in schematic, a torque converter in accordance with one embodiment of the present invention;

FIG. 2 illustrates a portion of FIG. 1 with a stator held vane inserted in the fluid flow from the impeller to the output turbine to reverse the tangential component of said fluid flow;

FIG. 3 illustrates a partial view taken along the line III—III of FIG. 1;

BEST MODE FOR CARRYING OUT THE INVENTION

Figure 4:
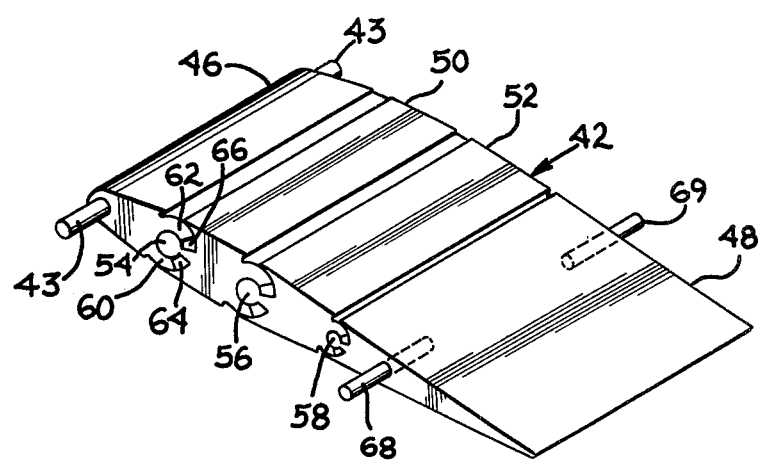
FIG. 4 illustrates a self-cambering blade in accordance with one embodiment of the present invention.

Adverting to FIG. 1 there is illustrated therein a torque converter 10 which comprises a stator 12, an impeller 14 and an output turbine 16. An input shaft 18 is driven by an engine (not illustrated) and serves to rotate the impeller 14. A plurality of conventional impeller blades 20 extend inwardly of the impeller and into a fluid filled compartment 22. As the impeller 14 and the impeller blades 20 rotate, fluid is impelled in the usual manner as shown by arrows in FIG. 1 with the impelled fluid having both an axial (leftward) flow component and a tangential flow component, i.e., either a clockwise or a counterclockwise component when looking leftwardly from the right hand end of FIG. 1. Appropriate bearings at 24 and 26 mount the impeller 14 to the stator 12. Similar bearings at 28 and 30 mount the output turbine 16 to the impeller 14. Further, additional similar bearings 32 and 34 mount the output turbine 16 to the stator 12. An output shaft 36 is mounted at appropriate bearings 38 to the stator 12. The output shaft 36 is keyed, splined or the like to the output turbine 16 as illustrated at 40.

FIGS. 1, 2, 4 and 5 illustrate a plurality of self-cambering blades 42 which are carried by the output turbine 16, each of the blades 42 being pivotally mounted at pins 43 between an annular plate 44 which is rigidly attached to turbine 16 as by a plurality of bushings 45 and the remainder of the turbine 16. The blades 42 are thus pivotally mounted at the pins 43 to pivot about axes which are generally parallel to the common axis of the impeller 14 and the output turbine 16. Thus, when the self-cambering blades 42 are reversed in shape from the solid line drawing shown in FIG. 5 to the broken line drawing shown therein, they serve to cause the output turbine 16 to rotate in different directions, either clockwise or counterclockwise when viewed from the right hand of FIG. 1 looking axially leftwardly.

Figure 5:
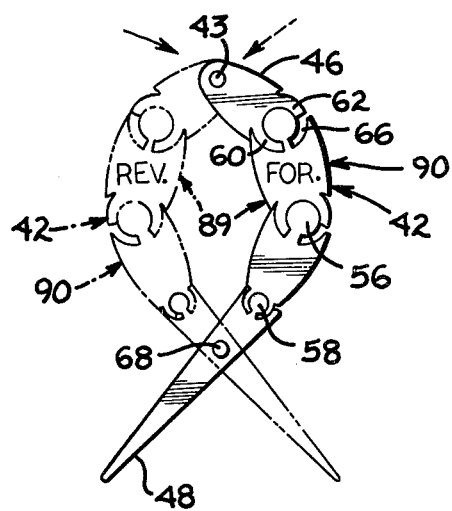
FIG. 5 illustrates the self-cambering blade of FIG. 4 with each of the sections thereof in its most clockwise and most counterclockwise position, said positions corresponding to forward and reverse operation of the torque converter.

Referring primarily to FIGS. 4 and 5, it will be noted that each of the preferred self-cambering blades 42 comprises a first section 46 which is shaped and positioned to receive flow from the impeller first, along with a final section 48 which is positioned to receive flow from the impeller last and which is shaped to release the fluid flow, and at least one intermediate section between the first section 46 and the final section 48. In the embodiments illustrated, there are two intermediate sections, namely an upstream intermediate section 50 and a downstream intermediate section 52. Each of the sections 46, 48, 50 and 52 comprise a generally linearly extending member. Each of the sections 46, 48, 50 and 52 is attached to the next in order (next downstream) of the sections with the first section 46 being pivotally attached to the upstream intermediate section 50 at a pivot 54, the upstream intermediate section 50 being attached to the downstream intermediate section 52 at a pivot 56 and the downstream intermediate section 52 being attached to the final section 48 at a pivot 58. As will be noted in FIG. 4 a pair of fingers 60 and 62 extend from the first section 46 about the pivot 54 within respective channels 64 and 66. Similar arrangements are formed at the pivots 56 and 58. In this manner, the channels 64 in which the fingers 60 move provides a stop means which stops the first intermediate section 50 from pivoting relative to the first section 46 in one direction, for example, counterclockwise, further than that shown in solid lines in FIG. 5. Similarly, as shown in broken lines at FIG. 5 the rotation in an opposite direction, clockwise, of the first intermediate section 50 relative to the first section 46 is limited by the channels 66 in which the fingers 62 move. Thus it is clear that two stable positions are provided for the shape of the self-cambering blade 42, namely the positions shown in FIG. 5. It should be noted that self-cambering blades of different natures can be substituted for the just described blades. For example, blades of limited flexibility such as plastic blades, perhaps having stiff metallic inserts, can be used without departing from the scope of the invention.

For each of the blades 42, a pair of pins 68, 69 fit within a pair of radially extending channels 70, 71 in the output turbine 16 (see FIG. 1), the channel 71 being in the annular plate 44. This allows the blades 42 to shift between the two positions illustrated in FIG. 5 while assuring rigidity of the blade shapes as shown. In the position marked "FOR." the angle of attack or inflow of the fluid is indicated in a solid lined arrow. The broken line arrow shows this angle for the "REV." position of the blade. It is further clear that each of the pivots 54, 56 and 58 is parallel to the pin 43 and hence is parallel to the linear extent of the respective sections 46, 50, 52 and 48 and also parallel to the common axis of the impeller 14 and the output turbine 16.

Adverting again to FIGS. 1 and 2 it will be noted that means 72 are provided for adjusting the angle at which fluid impelled by the impeller blades 20 impinges upon the self-cambering blades 42 to thereby control the direction of rotation of the output turbine 16. The impingement angle adjusting means 72 in the embodiment illustrated comprises a plurality of vanes 73, generally of an air flow configuration to minimize losses and each constrained from rotating within slots 74 as shown in FIG. 3, with the vanes 73 being carried by the stator 12. Enough vanes 73 are provided so that the angle at which fluid impelled by the impeller blades 20 impinges each of the self-cambering blades 42 is adjusted by the angle adjusting means 72. Means 75 are provided for controlling insertion and retraction of the vanes 73 in the flow of fluid between the impeller 14 and the self-cambering blades 42. In the particular embodiment illustrated the insertion and retraction controlling means 75 comprises means for biasing the vanes 73 out of the fluid flow, for example, a plurality of compression springs 76 shown extended in FIG. 1 and compressed in FIG. 2, along with means 77 for directing a pressurized fluid from a pressurized fluid source, shown as a pump 78, to exert a force overcoming the biasing means and move the vanes into the fluid flow. In the particular embodiment illustrated the vanes 73 each communicate via a rod 80 with a piston 82 slidably mounted within a bore 84. Pressurized fluid from the pump 78 is directed under the control of a forward and reverse control valve 86 to the bore 84 via a passage 88 formed within the stator 12. The pressurized fluid exerts a force against the piston 82 which compresses the spring 76 thereby forcing the vanes 73 into the flow of fluid from the impeller blades 20 (an arrow in FIG. 3 shows the flow direction) to the self-cambering blades 42. Generally, with the blades 73 in their retracted position as shown in FIG. 1, the angle of attack is such as to force the self-cambering blades 42 into the position shown in solid lines in FIG. 5. With the vanes 73 inserted in the fluid flow as illustrated in FIG. 2, the fluid flows past the air flow configuration vanes 73 and has its tangential component of flow substantially reversed whereby the self-cambering blades 42 are forced into the position shown in broken lines in FIG. 5. Because of the air flow configuration of the vanes 73, the axial component of the fluid flow is only relatively slightly reduced. It will be clear that the self-cambering blades 42 are shaped so as to provide a high pressure (concave) side (the shorter flow path side) 89 seen in FIG. 5 and a low pressure (convex) side (the longer path side) 90 also shown in FIG. 5. It will be noted that while the self-cambering blades 42 as disclosed herein are particularly advantageous when used in a torque converter 10 as illustrated herein, such self-cambering blades 42 can also find employment in different structures.

INDUSTRIAL APPLICABILITY

As will be generally apparent from the previous discussion, the present invention is concerned with an apparatus useful in carrying out a method for reversing the direction of rotation of a torque converter 10 which comprises the impeller 12, the stator 14 and the output turbine 16, with the output turbine 16 being coaxial with the impeller 14. The method is useful when the impeller 14 creates a fluid flow having an axial component and a tangential component and the output turbine 16 has blades which receive the fluid flow and serve to rotate the output turbine 16 and thereby the output shaft 36. The method comprises substantially reversing the tangential component, as by controlled insertion and retraction of the vanes 73 carried by the stator 12, and reversing the camber of the turbine blades 42. More particularly, the invention is particularly useful when one makes use of self-cambering blades 42 of the type disclosed and illustrated herein wherein the reversing of the camber of the blades 42 is made responsive to the substantial reversing of the tangential velocity component of the fluid. Thus, in order to reverse the direction of rotation of the output turbine 16 when it is initially in the position shown in FIG. 1, one simply shifts the control valve 86 from the F or forward position to the R or reverse position whereby fluid is directed from the pump 78 via the passage 88 to force the vanes 73 outwardly into the fluid flow within the chamber or compartment 22. This places the vanes 73 in the position shown in FIG. 2. As the fluid passes over the vanes 73 its tangential velocity component is substantially reversed whereby the angle of attack of the fluid within the compartment 22 as it impinges on the self-cambering blades 42 is shifted from that shown in the solid line arrow of FIG. 5 to that shown in the broken line arrow in FIG. 5 whereby the self-cambering blades 42 shift from the position shown in solid lines in FIG. 5 to the position shown in broken lines in FIG. 5. It will be clear that this leads to a reversing in the direction of rotation of the output turbine 16 and thereby of the output shaft 36. To return to the position shown in FIG. 1 it is only necessary to move the forward and reversing control valve 86 rightwardly back to the F or forward position whereby the pressure in the passage 88 is vented via the control valve 86 to sump and the spring 76 forces the vanes 73 to retract from the compartment 22.

It should be noted that in its broader aspects the invention is useful with a number of other self-cambering blades besides that actually illustrated herein, e.g., blades having a limited flexibility, although, it has been found to be particularly advantageous to utilize a sectioned self-cambering blade 42 as shown herein. When operating in accordance with the present invention one can attain both forward and reverse operation of a torque converter whereas in the prior art it has always been necessary to operate a torque converter in a single direction, e.g., forward, and, if reverse operation is required, to provide appropriate gearing driven by the output shaft of the output turbine. Thus, the present invention has provided simplicity of operation, a minimum number of moving parts, and reduced overall weight and space requirements for the torque converter system.

Other aspects, objects and advantages of this invention can be obtained from a study of the drawings, the disclosure and the appended claims.

What is claimed is:

1. In a torque converter (10) having a stator (12), an impeller (14) and an output turbine (16), the improvement comprising:
    a plurality of self-cambering blades (42) carried by said output turbine (16); and
    means (72) for adjusting the angle at which fluid impelled by said impeller (14) impinges upon said self-cambering blades (42) and the resultant direction of rotation of said output turbine (16).

2. An improvement as in claim 1, wherein said angle adjusting means (72) comprise a plurality of vanes (73) carried by said stator (12) and means (75) for controlling insertion and retraction of said vanes (73) in a flow of fluid between said impeller (14) and said self-cambering blades (42).

3. An improvement as in claim 2, wherein said insertion and retraction controlling means (75) comprises means (76) for biasing said vanes (73) out of said fluid flow and means (77) for directing a pressurized fluid from a pressurized fluid source (78) to exert a force overcoming said biasing means (76) and move said vanes (73) into said fluid flow.

4. An improvement as in claim 2, wherein said impeller (14) and said output turbine (16) are substantially coaxial and said self-cambering blades (42) are pivotally mounted to pivot about axes (43) generally parallel to the axis of said impeller (14) and said output turbine (16), fluid flowing from said impeller (14) has an axial velocity component and a tangential velocity component imparted thereto by said impeller (14), and said vanes (73) substantially reverse said tangential velocity component.

5. An improvement as in claim 1, wherein each of said self-cambering blades (42) comprises a first section (46) pivotally mounted on said output turbine (16) and receiving flow from the impeller (14) first, a final section (48) receiving flow from the impeller (14) last and at least one intermediate section (50) between the first section (46) and the final section (48), each of said sections being linearly extending members, means (60,62) pivotally attaching each member to a next in order of said members along pivotal axes (54,56,58) parallel to the linear extent of said members, and means (64,66) for stopping pivoting of each of said members relative to the next in order thereof in both a clockwise and a counterclockwise direction after a preselected amount of relative rotation.

6. An improvement as in claim 5, wherein said impeller (14) and said output turbine (16) are coaxial, said first sections (46) are pivotally mounted for pivoting generally about axes (43) generally parallel to the common axis of said impeller (14) and said output turbine (16), fluid flowing from said impeller (14) has an axial velocity component and a tangential velocity component imparted thereto by said impeller, and said vanes (73) substantially reverse said tangential velocity component.

7. An improvement as in claim 5, wherein a first surface (89) of each blade is of a concave cross-sectional configuration at the fully rotated position of the respective blade sections in the one direction of rotation and said first surface (89) of each blade is of a convex cross-sectional configuration at the fully rotated position of the respective blade sections in the other direction of rotation.

8. A self-cambering blade (42) for reversing rotation of an output turbine (16), said turbine (16) being free of reversing gearing, comprising:
    a first linearly extending section (46) shaped to receive fluid flow;
    a final linearly extending section (48) downstream of said first section (46) and shaped to release fluid flow;
    at least one intermediate linearly extending section (50) between said first section (46) and said final section (48);
    means (60,62) for pivotally attaching each section to a next in order of said sections along pivotal axes (54,56,58) parallel to the linear extending of said sections; and
    means (64,66) for stopping pivoting of each of said sections relative to the next in order thereof in both a clockwise and a counterclockwise direction after a preselected amount of relative rotation.

* * * * *